(12) United States Patent
Schiwal

(10) Patent No.: US 11,732,436 B2
(45) Date of Patent: Aug. 22, 2023

(54) LOADER LIFT ARM

(71) Applicant: Clark Equipment Company, West Fargo, ND (US)

(72) Inventor: Branden Schiwal, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 123 days.

(21) Appl. No.: 17/185,190

(22) Filed: Feb. 25, 2021

(65) Prior Publication Data

US 2021/0180287 A1 Jun. 17, 2021

Related U.S. Application Data

(62) Division of application No. 15/957,170, filed on Apr. 19, 2018, now Pat. No. 10,934,681.

(Continued)

(51) Int. Cl.
*E02F 3/38* (2006.01)
*E02F 3/36* (2006.01)
(Continued)

(52) U.S. Cl.
CPC ............... *E02F 3/38* (2013.01); *B22D 25/00* (2013.01); *B22D 25/02* (2013.01); *E02F 3/3414* (2013.01);
(Continued)

(58) Field of Classification Search
CPC ......... E02F 3/422; E02F 3/382; E02F 3/3686; E02F 3/3414; E02F 3/38
See application file for complete search history.

(56) References Cited

U.S. PATENT DOCUMENTS 1,679,879 A 8/1928 Russell
4,141,160 A 2/1979 Olson
(Continued)

FOREIGN PATENT DOCUMENTS

EP 2947209 A1 11/2015
JP 2010059683 A 3/2010
(Continued)

OTHER PUBLICATIONS

Invitation to Pay Additional Fees And, Where Applicable, Protest Fee dated Jul. 13, 2018 for International Application No. PCT/US2018/028290 filed Apr. 19, 2018, 12 pages.

(Continued)

*Primary Examiner* — Ronald P Jarrett
(74) *Attorney, Agent, or Firm* — John Veldhuis-Kroeze; Westman, Champlin & Koehler, P.A.

(57) ABSTRACT

Disclosed embodiments include power machines and related structures of lift arms, implement carriers, follower links, and driver links which improve manufacturability, reduce component failures, and improve power machine design and functionality. In some embodiments, lift arm structures include cast lower lift arm portions. The cast lower lift arm portions include contoured upper ends which are sleeved onto contoured lower ends of upper lift arm portions to control stress points and to reduce stresses on welds. The follower link structures can include follower links which are configured to be positioned at least partially outside of the lift arm structure to improve rear visibility. The driver link structures can be configured to be laterally overlapping with innermost surfaces on the lift cylinder, but configured such that as the lift arm is raised the laterally overlapping portions are moved above the innermost surfaces of the lift cylinder.

3 Claims, 15 Drawing Sheets

Related U.S. Application Data

(60) Provisional application No. 62/487,153, filed on Apr. 19, 2017.

(51) Int. Cl.
*E02F 3/42* (2006.01)
*E02F 3/34* (2006.01)
*B22D 25/02* (2006.01)
*B22D 25/00* (2006.01)
*E02F 3/627* (2006.01)
*A01B 63/24* (2006.01)

(52) U.S. Cl.
CPC ............ *E02F 3/3686* (2013.01); *E02F 3/382* (2013.01); *E02F 3/422* (2013.01); *E02F 3/627* (2013.01); *A01B 63/24* (2013.01)

(56) References Cited

U.S. PATENT DOCUMENTS

| | | | |
|---|---|---|---|
| 4,159,796 A | 7/1979 | Braithwaite | |
| 4,260,322 A | 4/1981 | Cameron | |
| 4,428,173 A | 1/1984 | Knell | |
| 4,904,151 A | 2/1990 | Biemans et al. | |
| 5,599,158 A | 2/1997 | Ajilore | |
| 6,106,217 A | 8/2000 | Knell | |
| 6,325,589 B1 * | 12/2001 | Jang .................... E02F 3/3405 414/685 | |
| 6,386,822 B1 | 5/2002 | Burr | |
| D468,754 S | 1/2003 | Dershem et al. | |
| 6,508,019 B1 | 1/2003 | Sasaki et al. | |
| 6,616,398 B2 | 9/2003 | Dershem et al. | |
| 6,637,111 B2 | 10/2003 | Sasaki et al. | |
| 6,851,886 B2 | 2/2005 | Anderson | |
| 7,264,435 B2 | 9/2007 | Layko et al. | |
| D600,721 S | 9/2009 | Shimomura et al. | |
| 7,824,145 B2 | 11/2010 | Kisse | |
| 7,881,845 B2 | 2/2011 | Nichols | |
| D646,302 S | 10/2011 | Lanting et al. | |
| D646,303 S | 10/2011 | Lanting et al. | |
| D654,514 S | 2/2012 | Jamieson et al. | |
| 8,342,789 B2 | 1/2013 | Yasuda et al. | |
| 8,419,339 B2 | 4/2013 | Okumura et al. | |
| 8,545,163 B2 | 10/2013 | Yasuda et al. | |
| 8,556,014 B2 | 10/2013 | Smith et al. | |
| 8,616,318 B2 | 12/2013 | Kotani et al. | |
| 8,631,580 B2 | 1/2014 | Randall et al. | |
| 8,821,104 B2 * | 9/2014 | Yasuda ................ E02F 9/0816 414/722 | |
| 8,992,158 B2 | 3/2015 | Springer et al. | |
| 9,945,093 B1 | 4/2018 | Belliveau | |
| 2003/0126772 A1 | 7/2003 | Masumoto et al. | |
| 2004/0170472 A1 | 9/2004 | Anderson | |
| 2007/0104566 A1 | 5/2007 | Layko et al. | |
| 2008/0035357 A1 | 2/2008 | Heitlinger | |
| 2008/0175701 A1 | 7/2008 | Kisse | |
| 2010/0143086 A1 | 6/2010 | Yasuda et al. | |
| 2010/0158653 A1 | 7/2010 | Webb et al. | |
| 2011/0091307 A1 | 4/2011 | Yasuda et al. | |
| 2011/0299965 A1 | 12/2011 | Randall et al. | |
| 2013/0158836 A1 | 7/2013 | Smith et al. | |
| 2013/0216347 A1 | 8/2013 | Breuer et al. | |
| 2015/0003949 A1 | 1/2015 | Kusama | |
| 2015/0071752 A1 | 3/2015 | Carthy et al. | |
| 2015/0336778 A1 | 11/2015 | Ditzler et al. | |
| 2017/0086366 A1 | 3/2017 | Noll | |

FOREIGN PATENT DOCUMENTS

| | | |
|---|---|---|
| JP | 2010059684 A | 3/2010 |
| WO | 2008/118308 A1 | 10/2008 |
| WO | 2010023715 A1 | 3/2010 |
| WO | 2008/134820 A1 | 11/2018 |

OTHER PUBLICATIONS

International Search Report and Written Opinion dated Sep. 25, 2018 for International Application No. PCT/US2018/028290 filed Apr. 19, 2018, 23 pages.

U.S. Patent Office issued prosecution for U.S. Appl. No. 15/957,170, filed Apr. 19, 2018, including Notice of Allowance and Fees Due (PTOL-85) dated Dec. 15, 2020, 8 pages; Non-Final Rejection dated Jun. 29, 2020, 10 pages; Final Rejection dated Jan. 28, 2020, 11 pages; Non-Final Rejection dated Aug. 16, 2019, 9 pages; Requirement for Restriction/Election dated Mar. 29, 2019, 7 pages; 45 pages total.

Communication pursuant to Article 94(3) EPC for European patent application No. 18 723 164.2, dated Nov. 11, 2020, 4 pages.

Non-Final Rejection for U.S. Appl. No. 17/185,150, dated Feb. 2, 2022, 8 pages.

Final Rejection for U.S. Appl. No. 17/185,150, dated Sep. 29, 2022, 15 pages.

Communication pursuant to Article 94(3) EPC for European patent application No. 17 823 164.2, dated Sep. 30, 2021, 7 pages.

* cited by examiner

LOADER LIFT ARM

CROSS-REFERENCE TO RELATED APPLICATION

This application is a divisional of U.S. application Ser. No. 15/957,170, filed on Apr. 19, 2018, which published as U.S. Publication No. 2018/0305889 A1 on Oct. 25, 2018, which claims the benefit of U.S. Provisional Application No. 62/487,153, which was filed on Apr. 19, 2017, the contents of which are hereby incorporated in their entireties.

BACKGROUND

The present disclosure is directed toward power machines. More particularly, the present disclosure is directed toward lift arm and related structures for moving or handling material with an implement mounted on the lift arm structure.

Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines typically include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Typically, power machines include a lift arm structure pivotally mounted to the frame of the power machine, with one or more lift actuators coupled between the frame and the lift arm structure to raise and lower the lift arm structure during work operations. For example, the lift arm structure can be used to raise and lower a bucket to move material. Designing lift arm structures which are less complex to manufacture but which are sufficiently strong to endure high load stresses on the lift arm structure is challenging. Further, many lift arm structure designs adversely affect visibility for the operator of the power machine.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machines, lift arm structures, implement carriers, follower link structures, and driver link structures which improve manufacturability of the power machine, reduce component failures of the power machine, and improve power machine design and functionality. In some exemplary embodiments, lift arm structures include cast lower lift arm portions which directly pivotally couple to cast implement carrier plates. The cast lower lift arm portions include contoured upper ends which are sleeved onto contoured lower ends of upper lift arm portions to control stress points and to reduce stresses on welds between the upper and lower lift arm portions. In some embodiments, the follower link structures include cast follower links which are configured to be positioned at least partially outside of the lift arm structure to improve rear visibility for an operator of the power machine. In some embodiments, the driver link structures are configured to be at least partially laterally spaced from the frame of the power machine such that they laterally overlap with innermost surfaces on the lift cylinder, but such that as the lift arm is raised the laterally overlapping portions are moved above the innermost surfaces of the lift cylinder.

DETAILED DESCRIPTION

This discussion uses illustrative embodiments to disclose various concepts. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

The disclosed embodiments include power machines, lift arm structures, implement carriers, follower link structures, and driver link structures which improve manufacturability, reduce component failures, and improve power machine design. In some exemplary embodiments, lift arm structures include cast lower lift arm portions. The cast lower lift arm portions can be directly pivotally coupled to cast implement carrier plates. The cast lower lift arm portions can include, in some embodiments, contoured upper ends which are sleeved onto contoured lower ends of upper lift arm portions to control stress points and to thereby reduce stresses on welds between the upper and lower lift arm portions.

In some embodiments, the follower link structures include cast follower links which are configured to be positioned at least partially outside of the lift arm structure to improve rear visibility for an operator of the power machine. Also, in some embodiments, the driver link structures are configured to be at least partially laterally spaced from the frame of the power machine such that they laterally overlap with innermost surfaces on the lift cylinder, but such that as the lift arm is raised the laterally overlapping portions are moved from below the innermost surfaces of the lift cylinder to above the innermost surfaces of the lift cylinder such that the driver link does not damage the lift cylinder. This allows for more efficient use of space to improve design features without requiring the width of the power machine to be increased.

Figure 2:
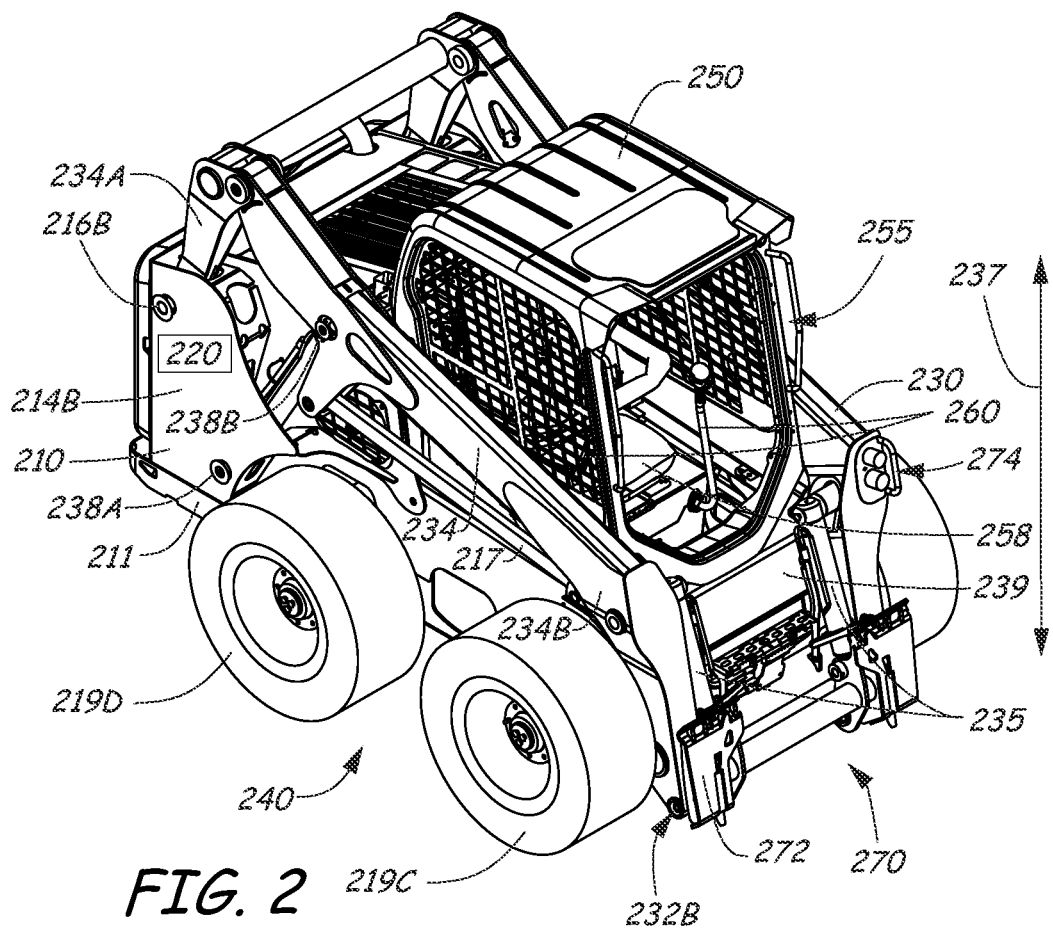
FIG. 2 is a front perspective view of a power machine on which embodiments disclosed herein can be advantageously practiced.
Figure 3:
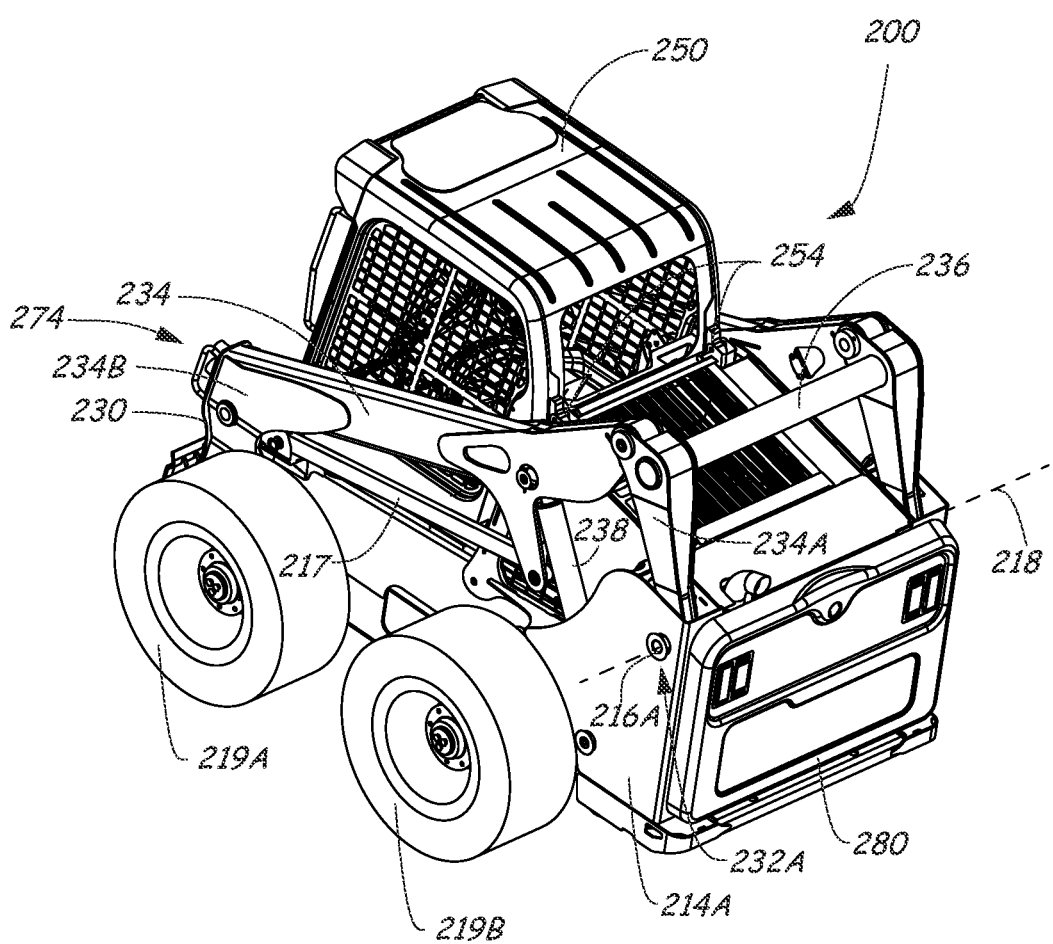
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. However, as mentioned above, the embodiments below can be practiced on any of a number of power machines, including power machines of different types from the representative power machine shown in FIGS. 2-3.

Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
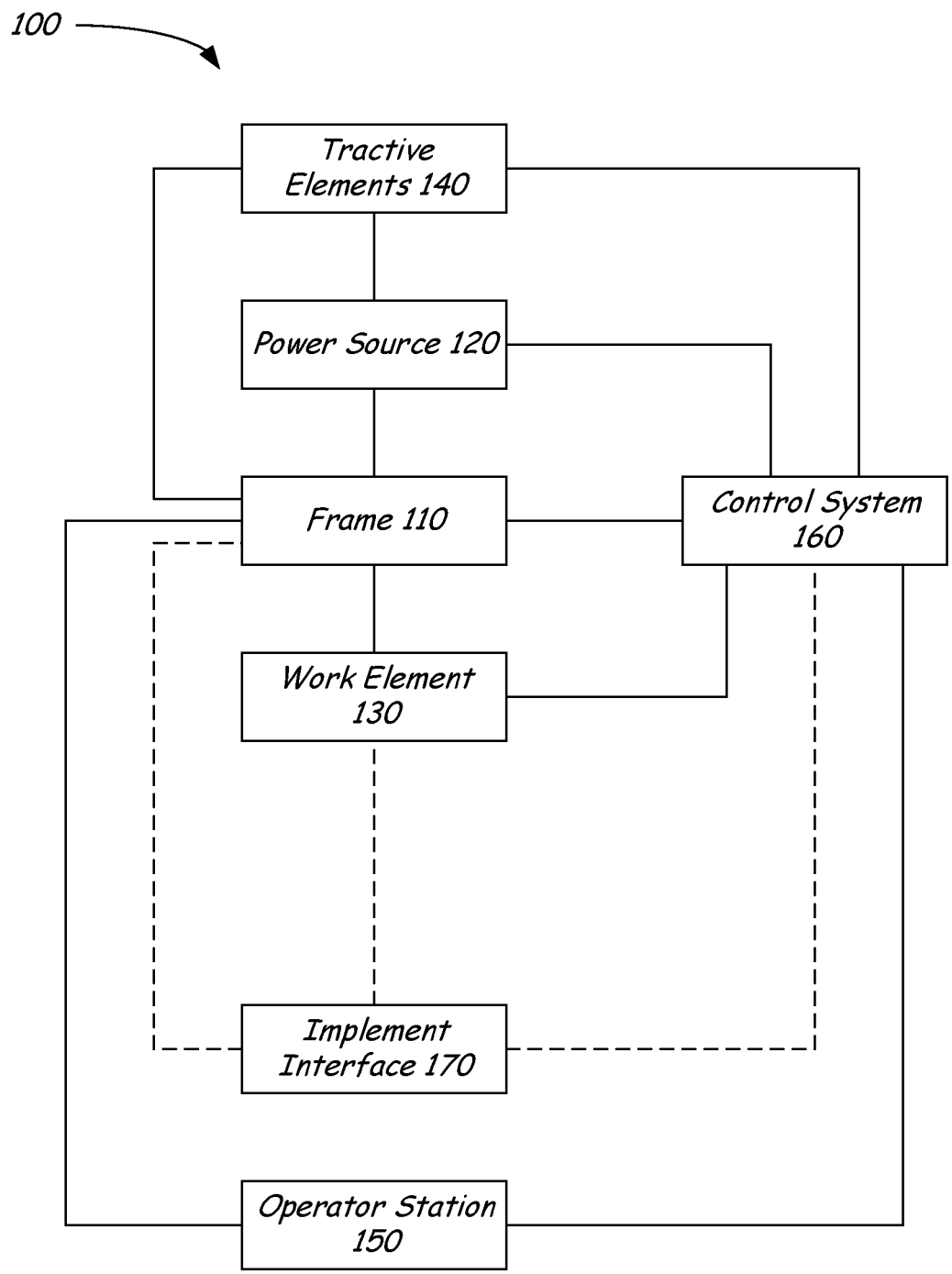
FIG. 1 is a block diagram illustrating functional systems of a representative power machine on which embodiments of the present disclosure can be advantageously practiced.

FIG. 1 shows a block diagram illustrating the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement for performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator controlled functions on the power machine.

Figure 4:
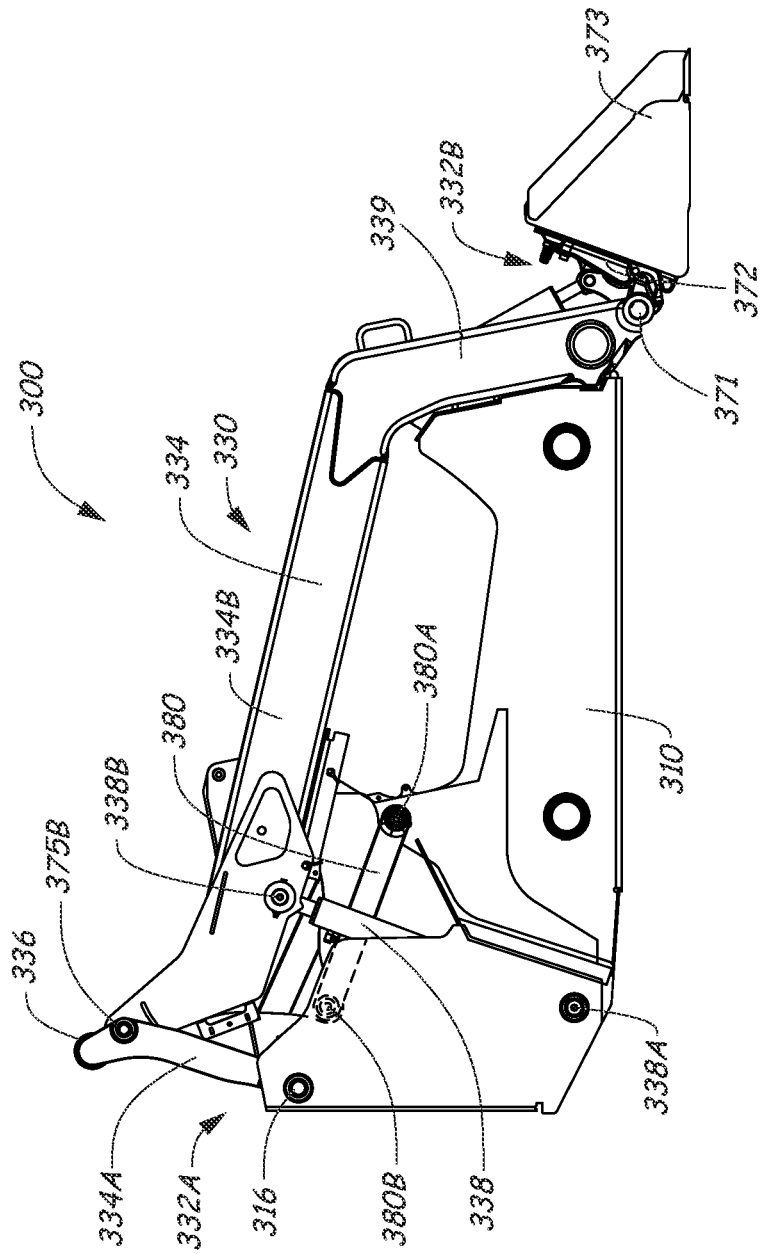
FIG. 4 is a side view illustration of components of another power machine on which embodiments disclosed herein can be advantageously practiced.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples. In particular, the features of power machine frames described below can be utilized on wheeled loaders as well. An example embodiment of such a wheeled loader, commonly referred to as a skid-steer loader, is illustrated in FIG. 4.

Loader 200 includes frame 210 that supports a power system 220, the power system can generate or otherwise providing power for operating various functions on the power machine. Frame 210 also supports a work element in the form of a lift arm structure 230 that is powered by the power system 220 and can perform various work tasks. As loader 200 is a work vehicle, frame 210 also supports a traction system 240, which is also powered by power system 220 and can propel the power machine over a support surface. The lift arm structure 230 in turn supports an implement carrier interface 270, which includes an implement carrier 272 that can receive and securing various implements to the loader 200 for performing various work tasks and power couplers 274, which are provided to selectively provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Referring still to FIGS. 2 and 3, the elements of frame 210 discussed herein are provided for illustrative purposes and are not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. A tailgate 280 is provided in the rear of the machine to selectively provide access to an engine compartment. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242A and 242B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that can accept and securing a variety of different implements to the lift arm 230. Such implements have a machine interface that is configured to be engaged with the implement carrier 272. The implement carrier 272 is pivotally mounted to the second end 234B of the arm 234. Implement carrier actuators 235 are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 242A and 242B. Each of the tractive elements 242A and 242B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as skid-steer loader 200, unless otherwise noted or recited, the concepts discussed below are not intended to be limited in their application to the environments specifically described above.

Figure 5:
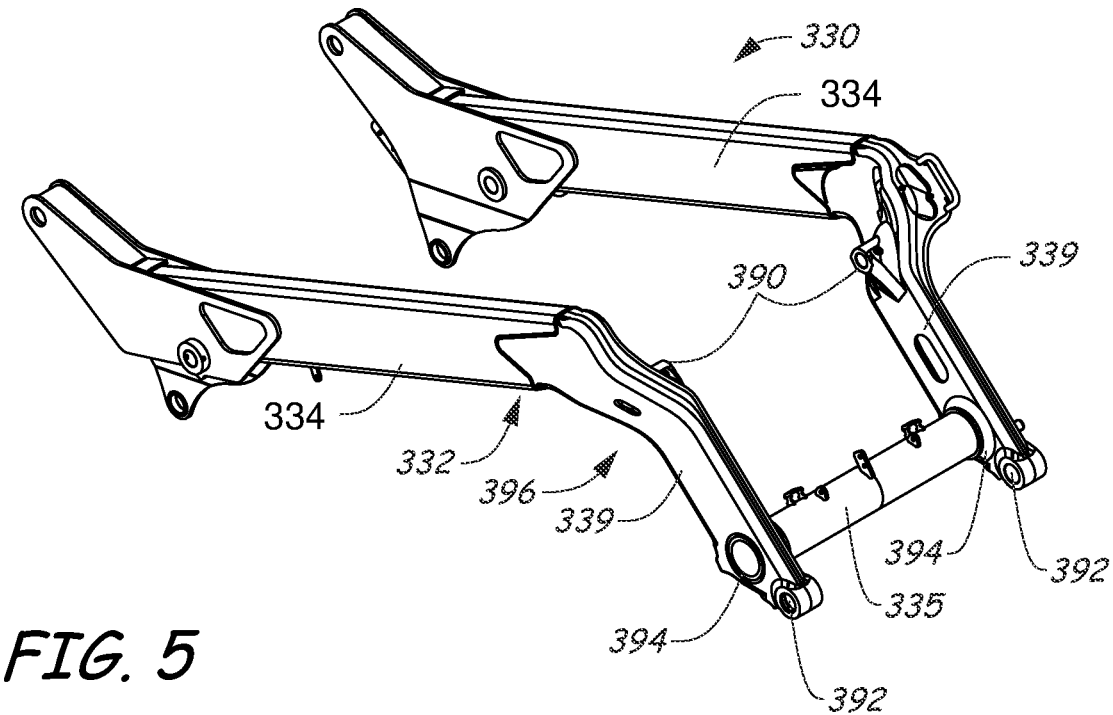
FIGS. 5 and 6 are perspective view illustrations of a lift arm structure of the power machine shown in FIG. 4.

FIG. 4 is a side view of a portion, including a lift arm structure 330, of a power machine 300, which is another power machine on which disclosed embodiments can be implemented. FIG. 5 illustrates a portion of the lift arm structure 330 of FIG. 4. In FIG. 4, frame 310 and lift arm structure 330 of power machine 300 are illustrated, while other power machine components are omitted to better illustrate certain features. In power machine 300, lift arm structure 330 includes a pair of main lift arm portions 334. Each of the main lift arm portions 334 includes a first portion 334A and a second portion 334B that is pivotally coupled to the first portion 334A. The first portion 334A of each main lift arm 334 is pivotally coupled to the frame 310 (which represents a first end 332A of the lift arm 334) at one of the joints 316 and the second portion 334B extends from its connection to the first portion 334A to a second end 332B of the lift arm 334. The main lift arm portions 334 are each coupled to a cross member 336 that is attached to the first portions 334A and to a cross member 335 that is attached to the second portions 334B.

An implement carrier 372 is rotatably mounted, by a pivotal attachment 371, to cast lower lift arm portions 339. Although not necessarily a part of the power machine 300, an implement 373 is shown mounted on implement carrier 372 for illustrative purposes. In an exemplary embodiment, implement 373 is a bucket type of implement for a loader type of power machine.

On each side of frame 310, a lift cylinder or actuator 338 is pivotally attached to the frame at pivot attachment 338A. The lift cylinder 338 is also pivotally attached at pivot attachment 338B to the lift arm structure 330. The first portion 324A acts as a follower link and is pivotally attached at pivot attachment 316 to frame 310 and at pivot attachment 375B to the second or main portion 334B of the lift arm structure 330. A driver link 380 is pivotally attached at pivot attachment 380A to frame 310 and at pivot attachment 380B to lift arm structure 330 (on the main or second portion 334B). The driver link, the follower link, the frame of the loader and the rest of the lift arm provide a four-bar linkage arrangement for the lift arm assembly 330. More detailed discussions of these various components are provided below with reference to FIGS. 5-22.

Lift Arm Structure

Figure 6:
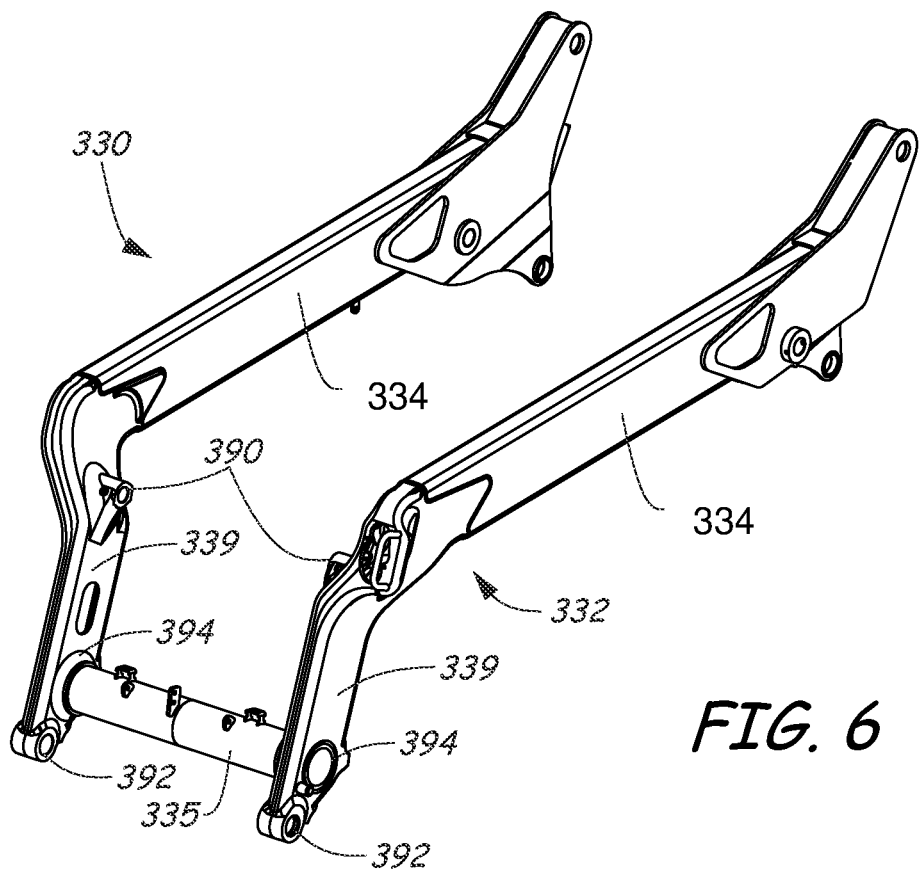
Figure 7:
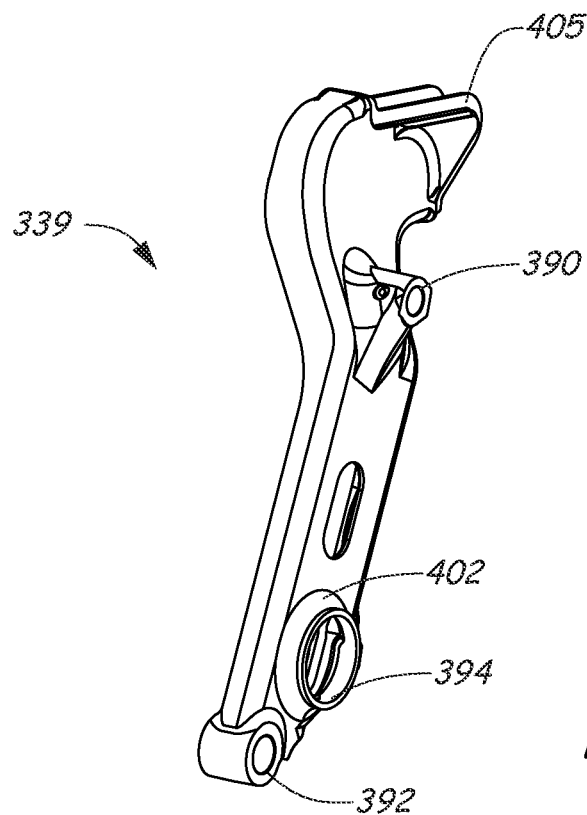
FIG. 7 is a perspective view of a cast lower lift arm portion of the lift arm structure illustrated in FIGS. 5 and 6 in accordance with exemplary embodiments.
Figure 8:
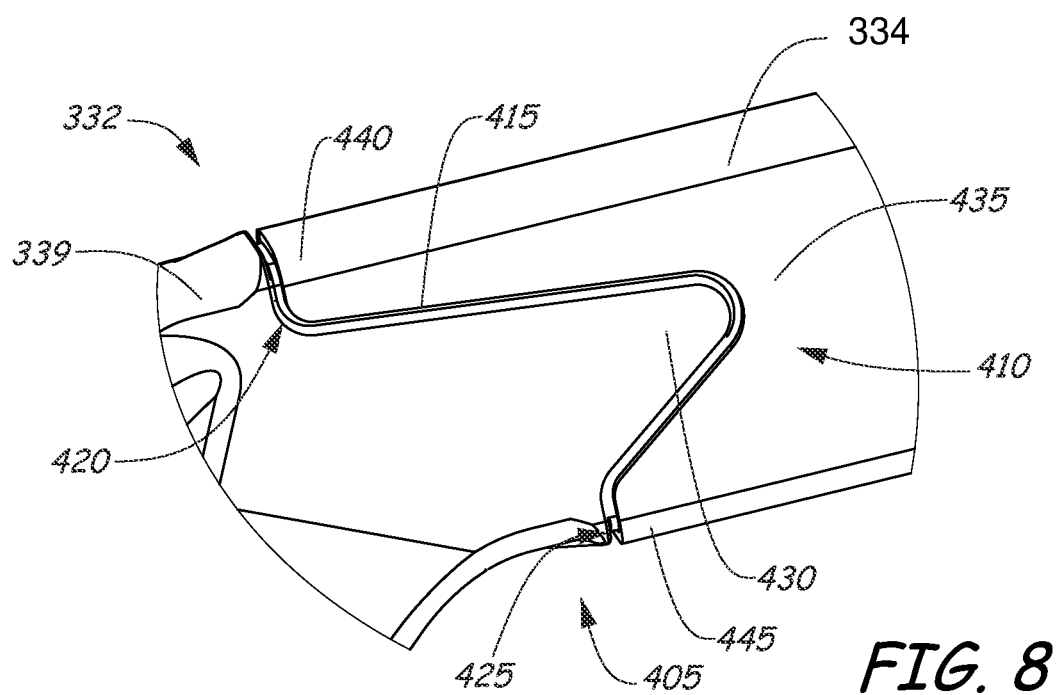
FIG. 8 is a perspective view illustration of contoured ends of the cast lower lift arm portion and of a main or upper lift arm portion in accordance with some exemplary embodiments.
Figure 9:
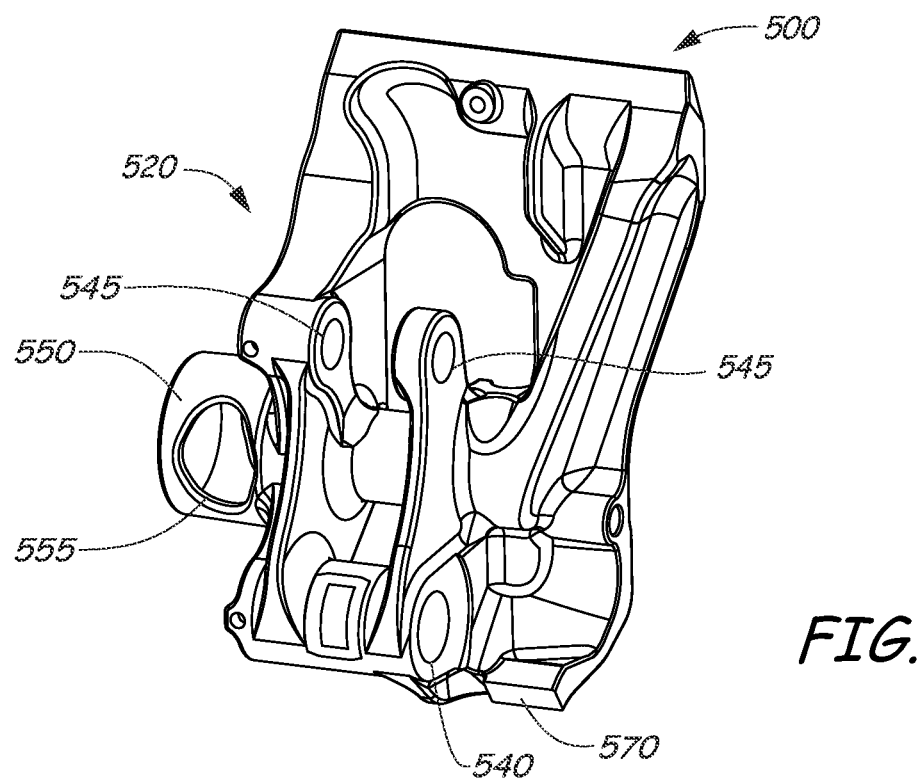
FIG. 9 is a first perspective view of a cast implement carrier plate in accordance with some exemplary embodiments.
Figure 10:
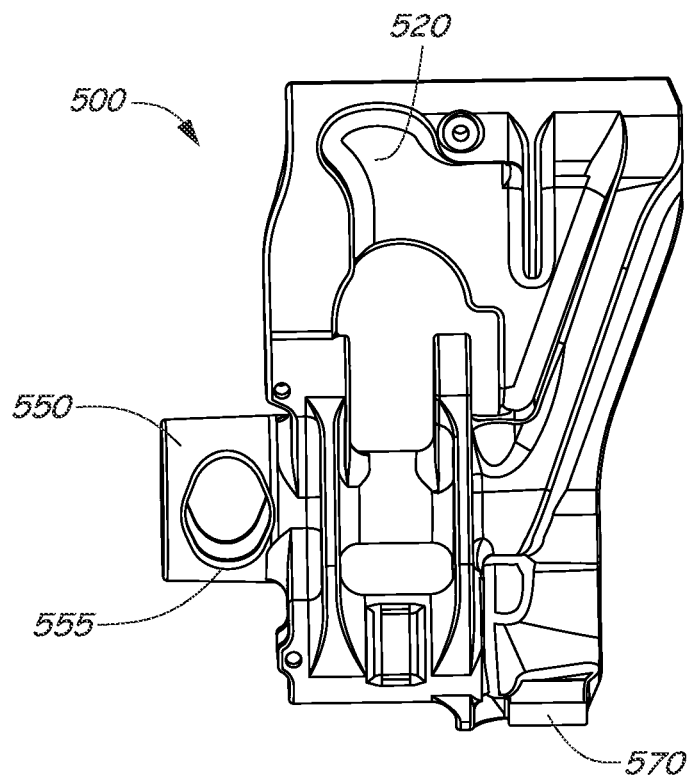
FIG. 10 is a machine side view of the implement carrier plate shown in FIG. 9.
Figure 11:
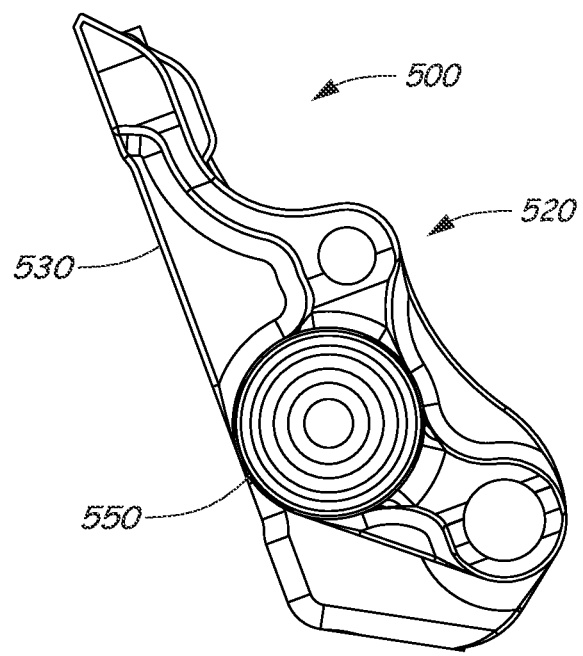
FIG. 11 is an end view of the implement carrier plate shown in FIG. 9.
Figure 12:
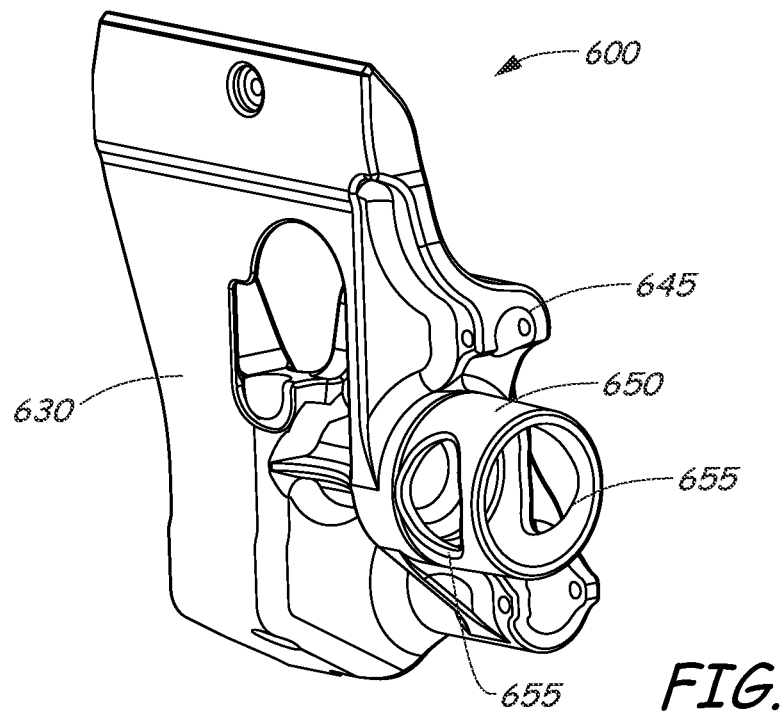
FIG. 12 is a second perspective view of the implement carrier plate shown in FIG. 9.

FIGS. 5-6 shows the lift arm structure 330 in greater detail. FIG. 7 illustrates an embodiment of lower lift arm portion 339 that is formed from a casting in greater detail, and FIG. 8 illustrates features of upper or main lift arm portion 334 and cast lower lift arm portion 339 at a junction 332 where the two lift arm portions are welded together. While some embodiments of lift arm structures may not have cast lower lift arms, the embodiment shown in FIGS. 5-8 illustrate cast lower lift arms. Near the junction 332 between the respective main lift arm portions 334 and cast lower lift arm portions 339, the lower lift arm portions 339 sloping downwardly more dramatically than the main portion from the main lift arm portions 334 (in some embodiments, the main lift arm portions need not slope downwardly) a "knee" is formed in exemplary embodiments. The term knee is used to describe the departure area between the main portion and the lower portion, even when, as is the case in the embodiment shown in FIGS. 5-6, there is no movable joint between the main lift arm portion and the lower lift arm portion. As shown in FIGS. 5-6, the two (left and right) cast lower lift arm portions 339 can have the same features, but can be mirror or reverse images of each other or at least substantially similar. While in this respect the cast lower lift arm portions may not be identical, a description of only one cast lower lift arm portion is provided below. Those of skill in the art will understand that the features discussed on one cast lower lift arm portion 339 can be implemented on a corresponding lower lift arm portion for the opposite side of the lift arm structure and that other features, not discussed herein may be present on one or the other without departing from the scope of this discussion.

Cast lower lift arm portions 339, in this embodiment, have hollow interiors and several cast features that provide improvements over conventional lower lift arm portions that are formed from one or more pieces of steel welded or otherwise fastened together. For example, cast lower lift arm portions 339 are formed to include inward offset or bend regions 396 which taper the width of the lift arm structure 330 from a width which is wider than the frame of the power machine down to a width necessary for attachment of the implement carrier and any attached implement. Forming this laterally inward bend or offset using traditional methods requires the welding of multiple different individual metal plates or pieces, which causes manufacturing to be more expensive and complex, and introduces a large number of welds, which can fail under exposure to repeated high stresses. Using a cast lower lift arm portion or member, the laterally inward bend or offset 396 can be formed to narrow the lift arm structure without requiring additional metal pieces or welds. This simplifies manufacturing, and produces a stronger lower lift arm portion which is less prone to stress failures. Further, using a cast lower lift arm portion allows for tighter control of tolerances of the part shape and dimensions than can be reasonably be achieved by welding multiple pieces together. If such dimensions are not tightly controlled, they can result in configurations in which the tilt cylinder (not shown) can be over-extended or over-retracted and thereby damaged or other misalignments can introduce unwanted stresses into the lift arm.

In lift arm structure 330, cast lower lift arm portions 339 include other features such as pivot attachment bores or apertures 390 for connecting the tilt cylinder (not shown) between lower lift arm portion 339 and the implement carrier 372 (shown in FIG. 4), and pivot attachment bores or apertures 392 for the pivotal attachment of the implement carrier directly to the cast lower lift arm portion. Also, structural tube bores or apertures 394 are formed in the lower lift arm portions and configured to receive a structural tube 335 that is a cross-member that extends between respective left and right lower lift arm portions 339 to provide strength and stability by resisting torque and other forces introduced into the lift arm.

FIG. 7 provides a perspective view of a cast lower lift arm portion 339 according to one illustrative embodiment. Cast lower lift arm portion 339 includes features which strengthen the lift arm structure and allow for deformation of portions of the cast material to reduce stress on welds between the lower lift arm portion 339 and structural tube 335, or between lower lift arm portion 339 and upper or main lift arm portion 334. For example, cast lower lift arm portion 339 includes a boss 402 surrounding structural tube aperture 394 to facilitate cast material deformation to absorb load stresses and thereby prevent transfer of those stresses to welds between the structural tube and lower lift arm portion 339. Also, lower lift arm portion 339 includes a contoured top end 405 which is configured to be received at least partially into a corresponding contoured bottom end 410 (shown in FIG. 8) of the upper or main lift arm portion 334, with the contoured ends joined at a junction 332. The shapes of the contoured ends and resulting junction 332 control the placement of the highest tension and compression stress points to reduce stress on welds between the upper and lower lift arm portions.

Referring more specifically to FIG. 8, contoured bottom end 410 of upper or main lift arm portion 334 is sleeved over part of contoured top end 405 of cast lower lift arm portion 339. A weld is placed in a channel 415 (the weld is not shown in FIG. 8) formed between contoured ends 405 and 410 of cast lower lift arm portion 339 and upper or main lift arm portion 334. The shapes of the contoured ends of lift arm portions 339 and 334 are designed to control the location of the highest tension (under load) point between the upper and lower lift arm portions, and the highest compression (under load) point between the two lift arm portions. For example, with the contour illustrated in FIG. 8, point 420 represents an example of the highest tension point, while point 425 is an example of the highest compression point. To control the location of these points, and to provide for regions of controlled deformation of one or both lift arm portions 334 and 339, a protruding kink section 430 is formed by the contoured top end 405 of the cast lift arm portion 339. A corresponding inlet kink section 435 is formed in the contoured bottom end 410 of upper or main lift arm portion 334 and is configured to receive the protruding kink section 430. This configuration forms a top extending member 440 of the upper or main lift arm portion 334, with the top extending member 440 extending further toward the knee region of lower lift arm portion 339 than other parts of the upper or main lift arm portion 334. A bottom extending member 445 is also formed by the contoured bottom end 410 of the upper or main lift arm portion 334 and is separated from top extending member 440 by inlet kink section 435. In this configuration, with top extending member 440 extending further than bottom extending member 445, the top extending member is configured to bend, deflect or deform slightly under heavily loaded conditions to absorb stresses and thereby reduce the stresses on weld 415.

Implement Carrier Structure

Figure 13:
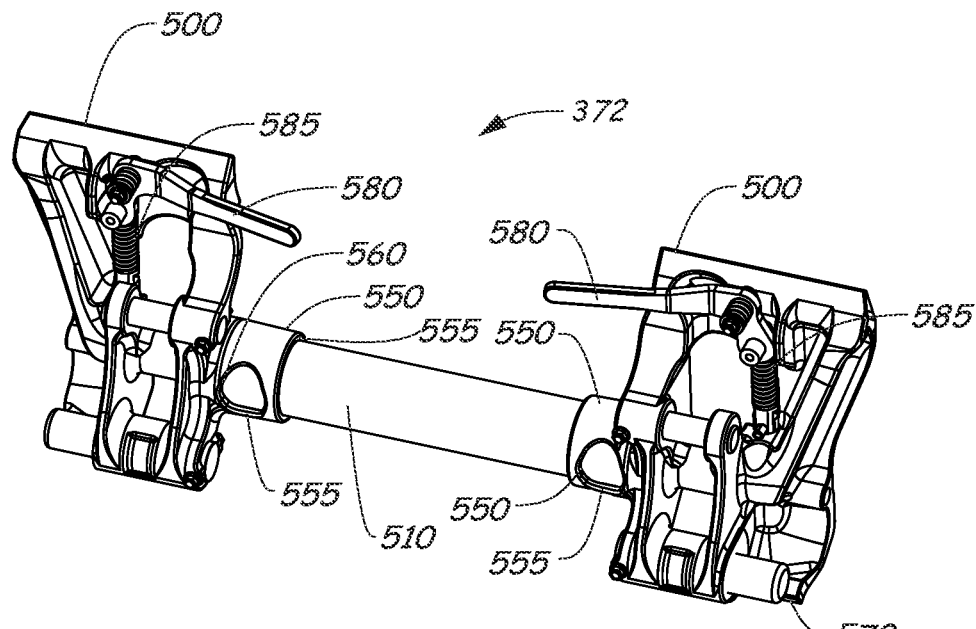
FIGS. 13 and 14 are perspective views of an implement carrier assembly including two cast implement carrier plates as shown in FIG. 9, with a structural tube extending therebetween.
Figure 14:
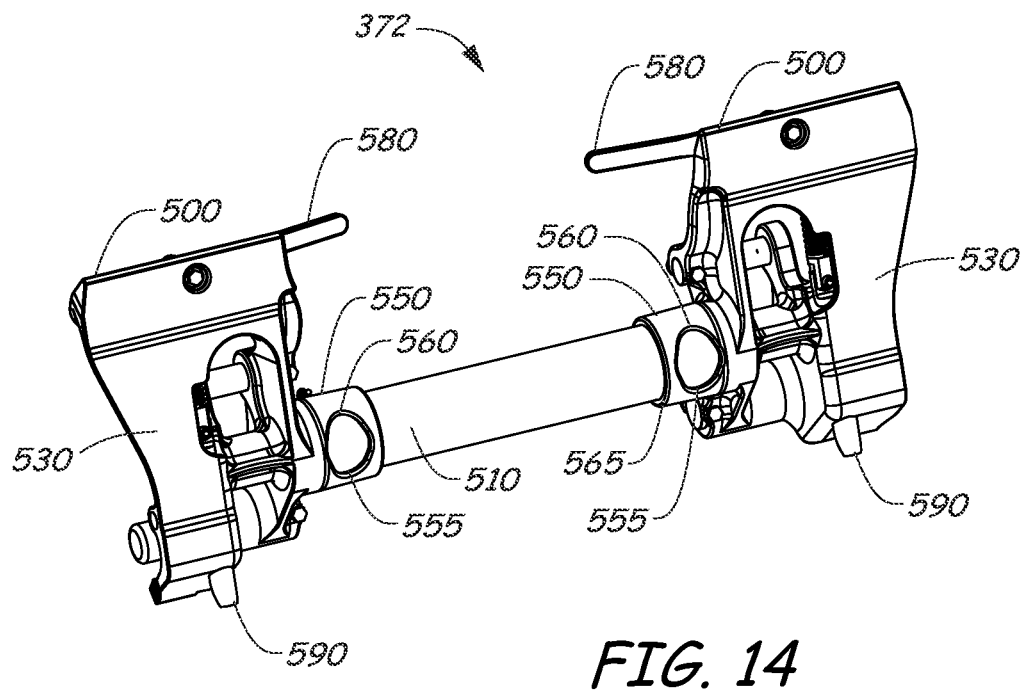
Figure 15:
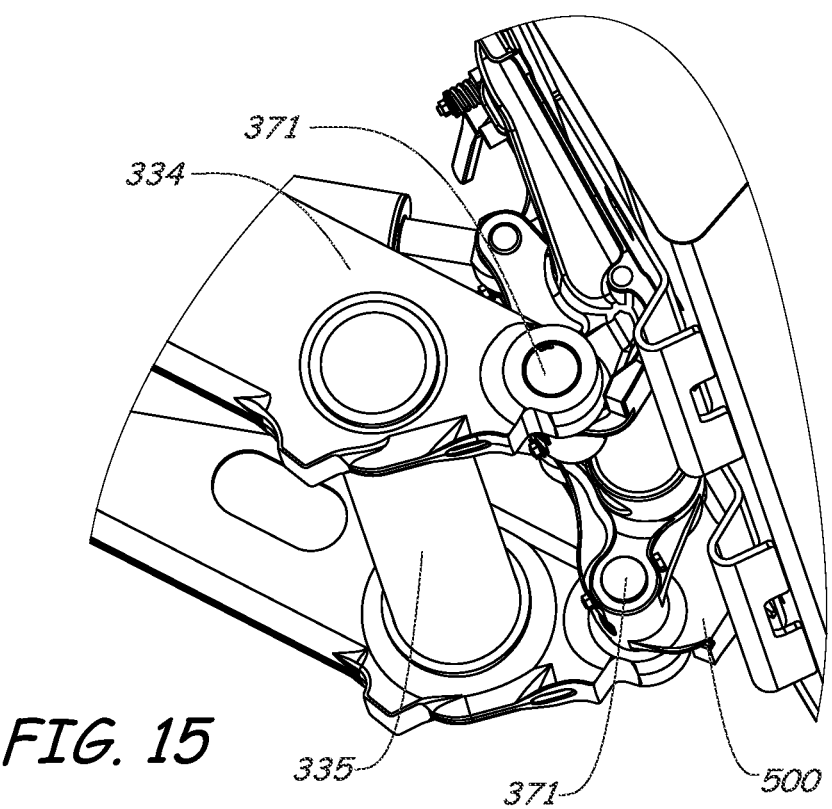
FIG. 15 is a perspective view illustration showing the exemplary implement carrier embodiment rotatably coupled to the cast lower lift arm portions.

FIGS. 9-12 illustrate one embodiment of a cast implement carrier plate 500 of implement carrier 372 shown in FIG. 4. FIGS. 13-14 are perspective view illustrations of implement carrier 372, which includes two cast implement carrier plates 500 coupled together with a structural tube 510 that is a cross-member welded to each plate 500. Each cast implement carrier plate 500 is configured to be pivotally attached or coupled to a different one of the pair of lower lift arm portions 339 of the lift arm structure at respective pivot attachments 371 discussed above and as shown in FIG. 15. The two (left and right) cast implement carrier plates can have the same features, but can be mirror or reverse images of each other. While the cast implement carrier plates may be mirror images of each other instead of identical, a description of only one implement carrier plate is shown in FIGS. 9-12 and discussed herein for brevity's sake. In some embodiments, each of the left and right cast implement carrier plates may have features that differ from the other that are not discussed herein. None of those differences will cause the implement carrier plates to depart from the scope of this discussion.

As shown best in FIGS. 9-12, each cast implement carrier plate 500 has a rear or power machine side 520 and an opposing front or implement interface side 530. The implement interface side 530 is configured to directly interface the implement (in other words, the casting itself is positioned directly against the implement). On rear side 520, each plate 500 has bores or apertures 540 for pivot attachment 371 (shown in FIG. 4) to pivotally attach the cast plate to lower lift arm portions 339. On the same rear side, each plate also includes bores or apertures 545 for pivot attachments between a tilt cylinder (not shown) and the cast plate to control tilt functions for an implement mounted on the implement carrier 372. On an inside end of each of the cast implement carrier plates, a structural tube or cross-member receiving collar 550 is included in the casting. Further, each structural tube receiving collar has side apertures 555 formed therein to allow for welds 560 (shown in FIGS. 13-14) and for improved deformability of collars 550 to absorb stress forces on the implement carrier plate 500. By allowing deformation of the cast implement carrier material in the region of collar 550, stress forces on welds 560 and 565 between the collar and the structural tube 510 are reduced.

Carrier plate 500 has a tilt stop machined surface 570 configured to contact the lower lift arm portion 339 or other stop surface to prevent further movement (in one direction) of the implement carrier relative to the lift arm portion. Surface 570 is machined onto the cast implement carrier plate to tightly control the maximum degree of extension of the tilt cylinder to prevent damage to the cylinder due to over-extension. Also, other surfaces of carrier plate 500 can be machined after casting to closely control dimensions and tolerances. For example, bores 540 and 545 can be machined, as can the aperture within collar 550.

After casting carrier plate 500 and machining any necessary surfaces, the implement locking mechanisms can be added to the carrier plate. For example, as shown in FIGS. 13 and 14, levers 580, spring mechanisms 585, and locking pins 590 can be added. These locking components are used for locking an implement into its position mounted on the implement interface side 530 of the cast plates 500.

Follower Link Structure

Figure 16:
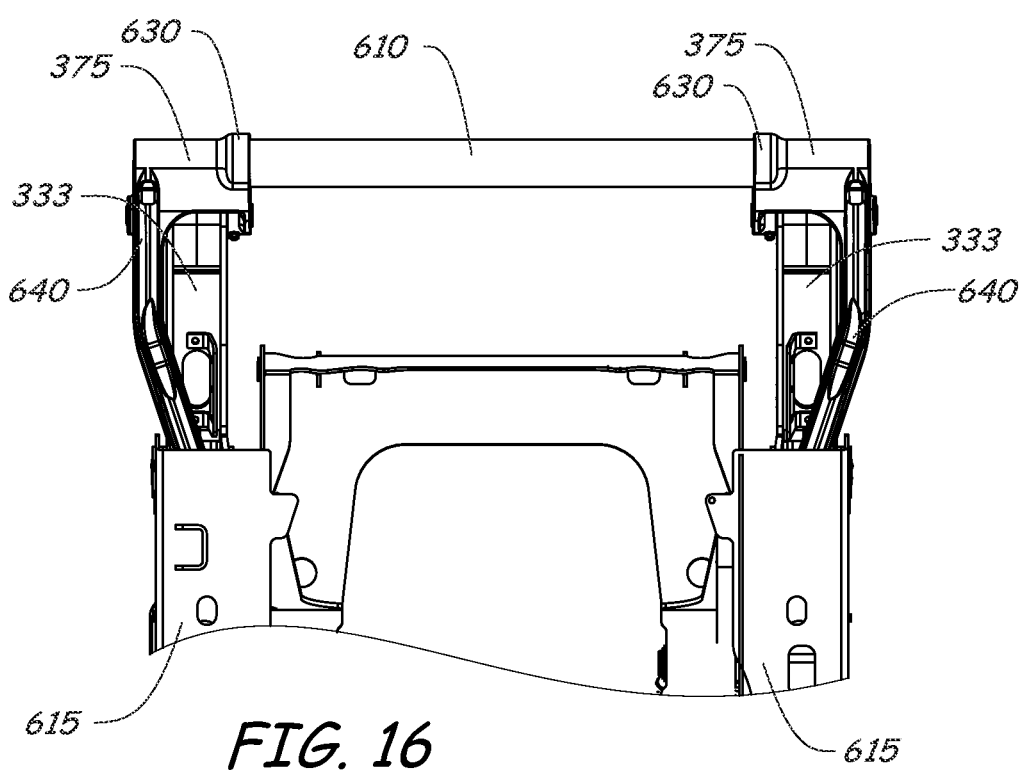
FIG. 16 is a rear view illustration of a portion of the power machine showing a cast follower link configuration in accordance with some exemplary embodiments.
Figure 17:
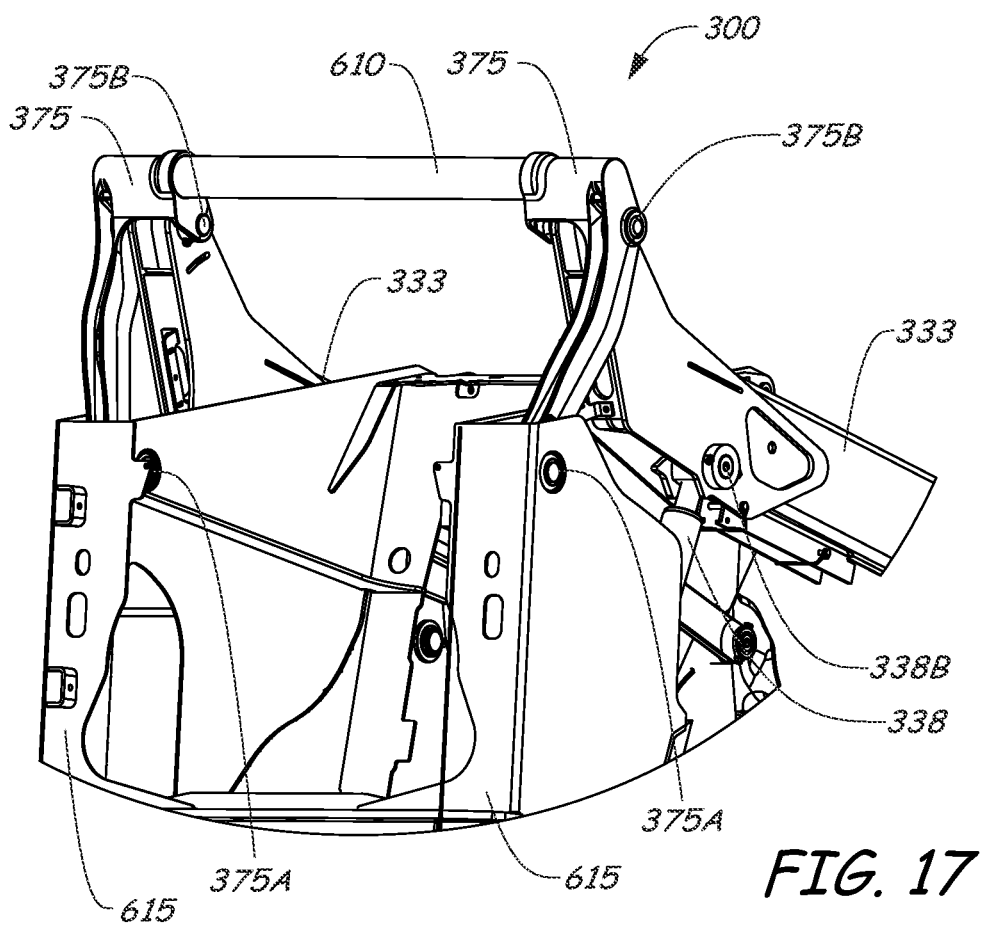
FIG. 17 is a partial perspective view of the power machine showing the follower link configuration of FIG. 16.
Figure 18:
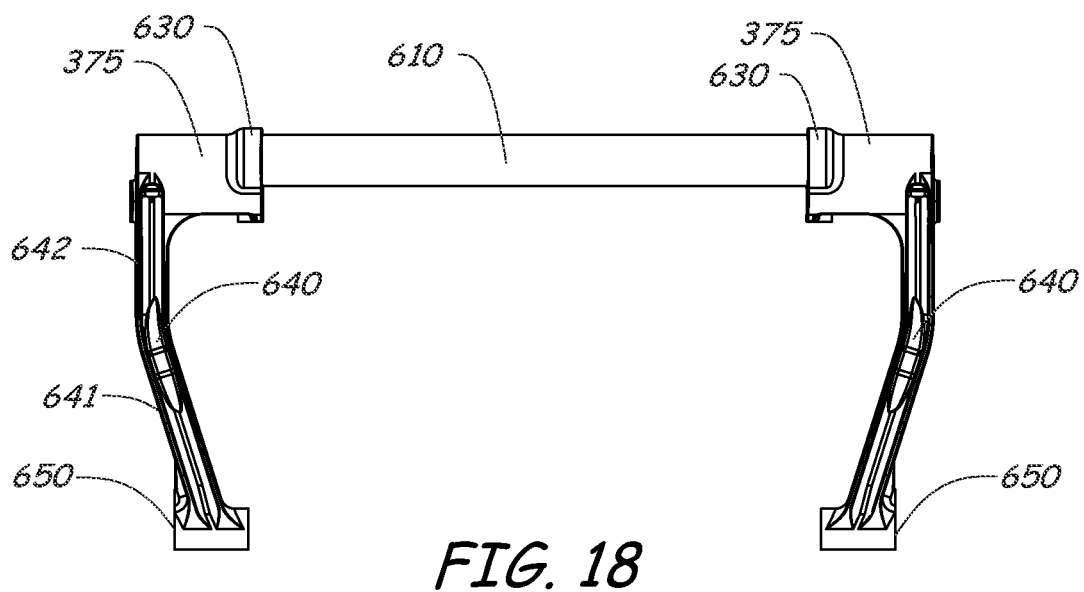
FIG. 18 is an illustration of the cast follower link members connected by a structural tube.

FIGS. 16-17 show partial rear and rear perspective views of power machine 300 illustrating follower links 375 in accordance with some exemplary embodiments. FIG. 18 illustrates the follower links 375 and structural tube 610 that is a cross-member separate from the power machine 300. In some embodiments, follower links 375 are formed as single pieces using a casting technique. In other embodiments, follower links can be otherwise constructed.

The follower links 375 include a structural tube (or cross-member) receiving collar 630 and an extension member 640 which extends from the collar 630 down to a pivot bore 650 used to provide the pivot attachment 375A (also referred to as pivot 316 on FIG. 4) to upright portions 615 of frame 310. The extension member has a first portion 641 which is at least partially in-line with a main portion of the lift arm structure of the power machine when viewed from directly behind the power machine and a second portion 642 positioned outward from the first portion such that the link casting lift arm attachment point is outside of the lift arm structure. The first portion 641 can be angled outward to transition between positions which are in-line with the main portions of the lift arm and positions which are outward. By positioning the follower link outside of the main lift arm portion, visibility from an operator compartment rearward is advantageously improved. The structural tube 610 extends between the collar 630 of each of the follower links 375. The collar 630 allows the follower link material to twist or deform to reduce the stress on the weld between the structural tube and the follower link. As shown in FIG. 17, a pivot attachment 375B couples the lift arm structure 330 to the follower link 375.

Using a cast material for follower links 375 provides numerous advantages. For example, using a casting allows close control of dimensions and tolerances between the lift arm pivot bore 650 and the pivot bore in collar 630. It also allows material to be removed from the follower link casting, while at the same time making the follower link stronger due in part to less usage of welds. As can be seen in FIG. 16, extension members 640 of follower links 375 are positioned outside of upper or main lift arm portions 334 from collar 630 at least part of the way toward the pivotal attachments of the follower links to the upright portions 615 of the power machine frame. This provides improved rear visibility for an operator of the power machine.

Driver Link Structure and Path

Figure 19:
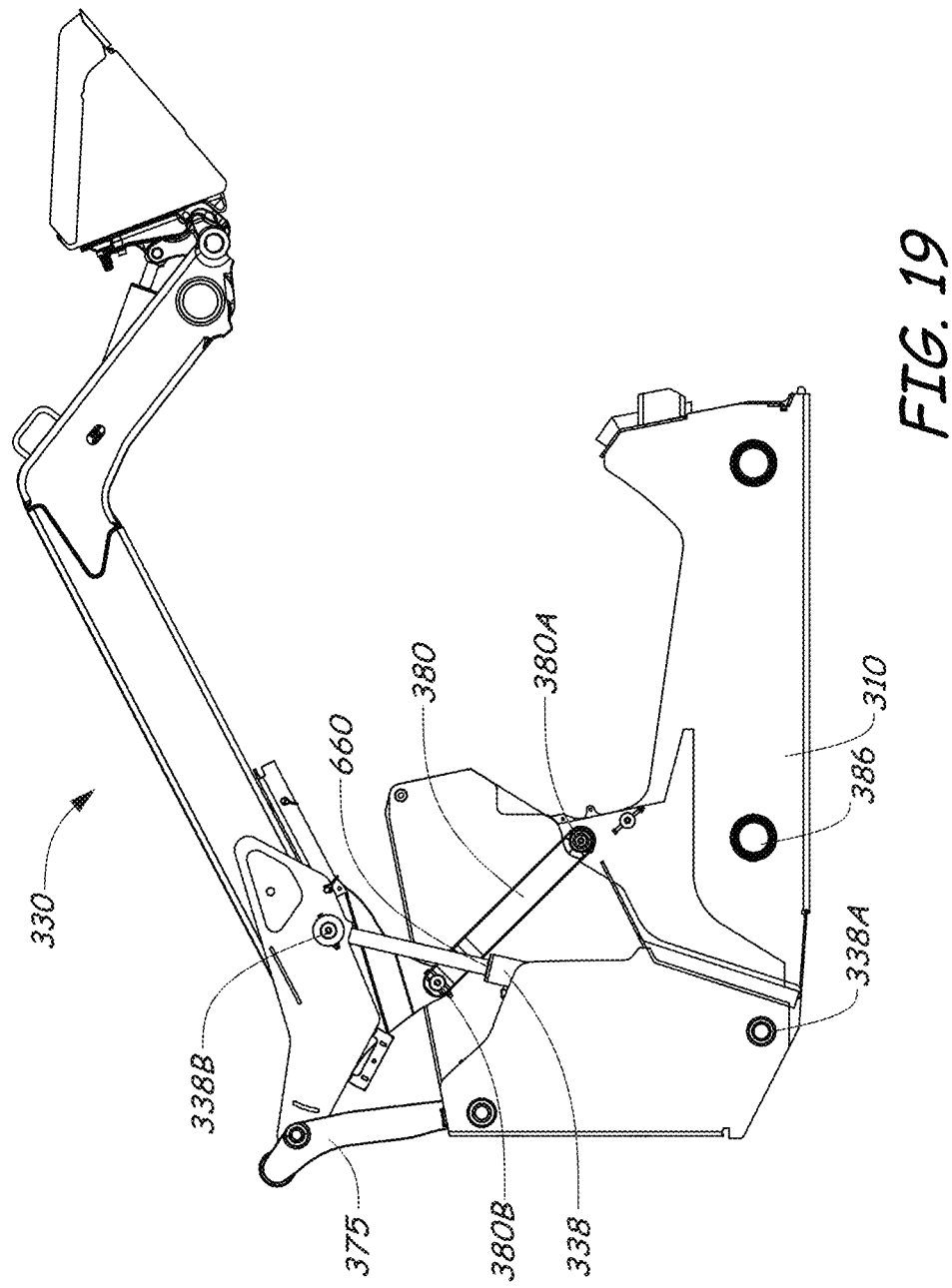
FIGS. 19-21 are side view illustrations showing a relational positioning of a pivot attachment between a driver link of the power machine and the lift arm structure relative to a top end of a lift cylinder base in accordance with some exemplary embodiments.
Figure 20:
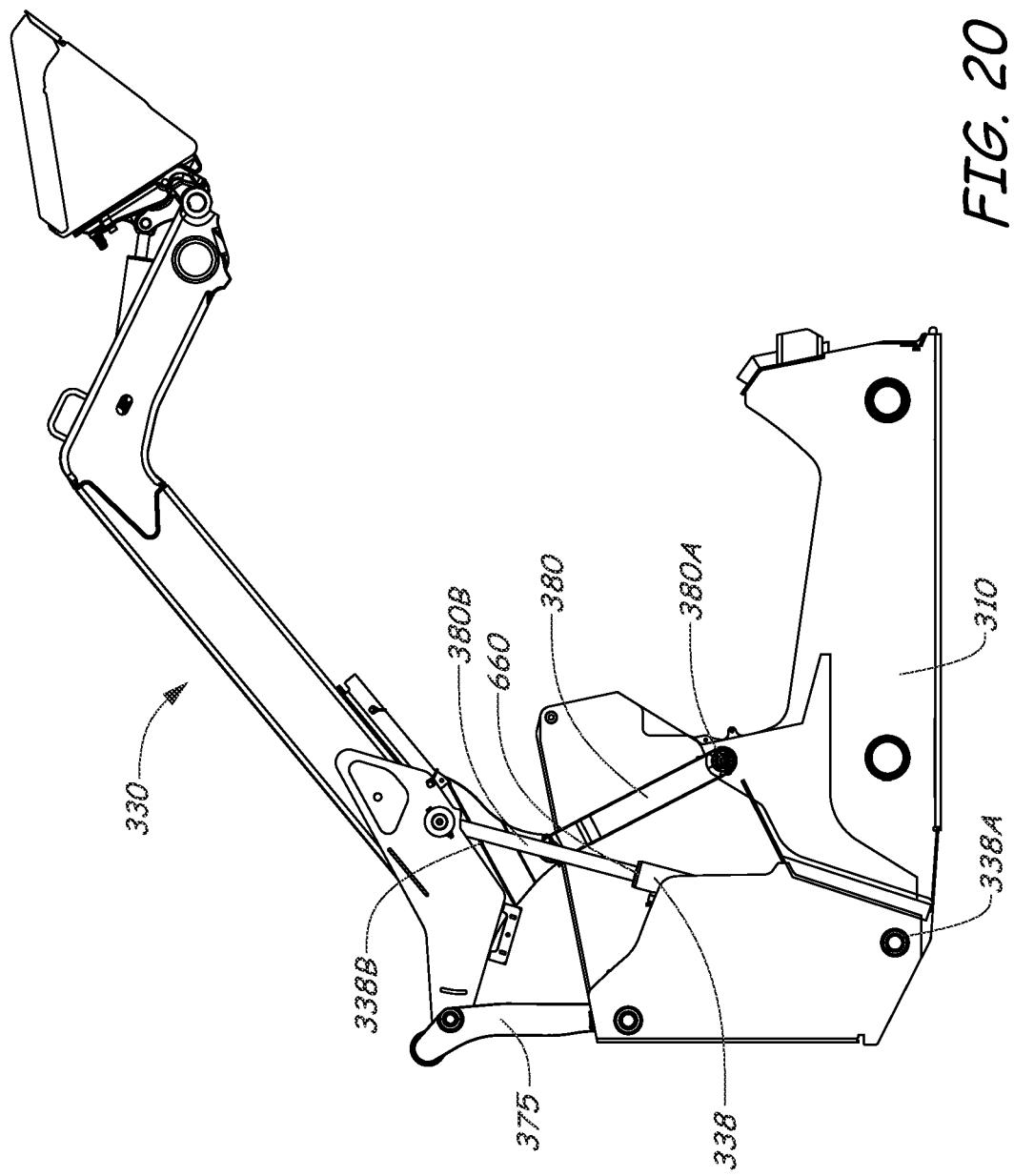
Figure 21:
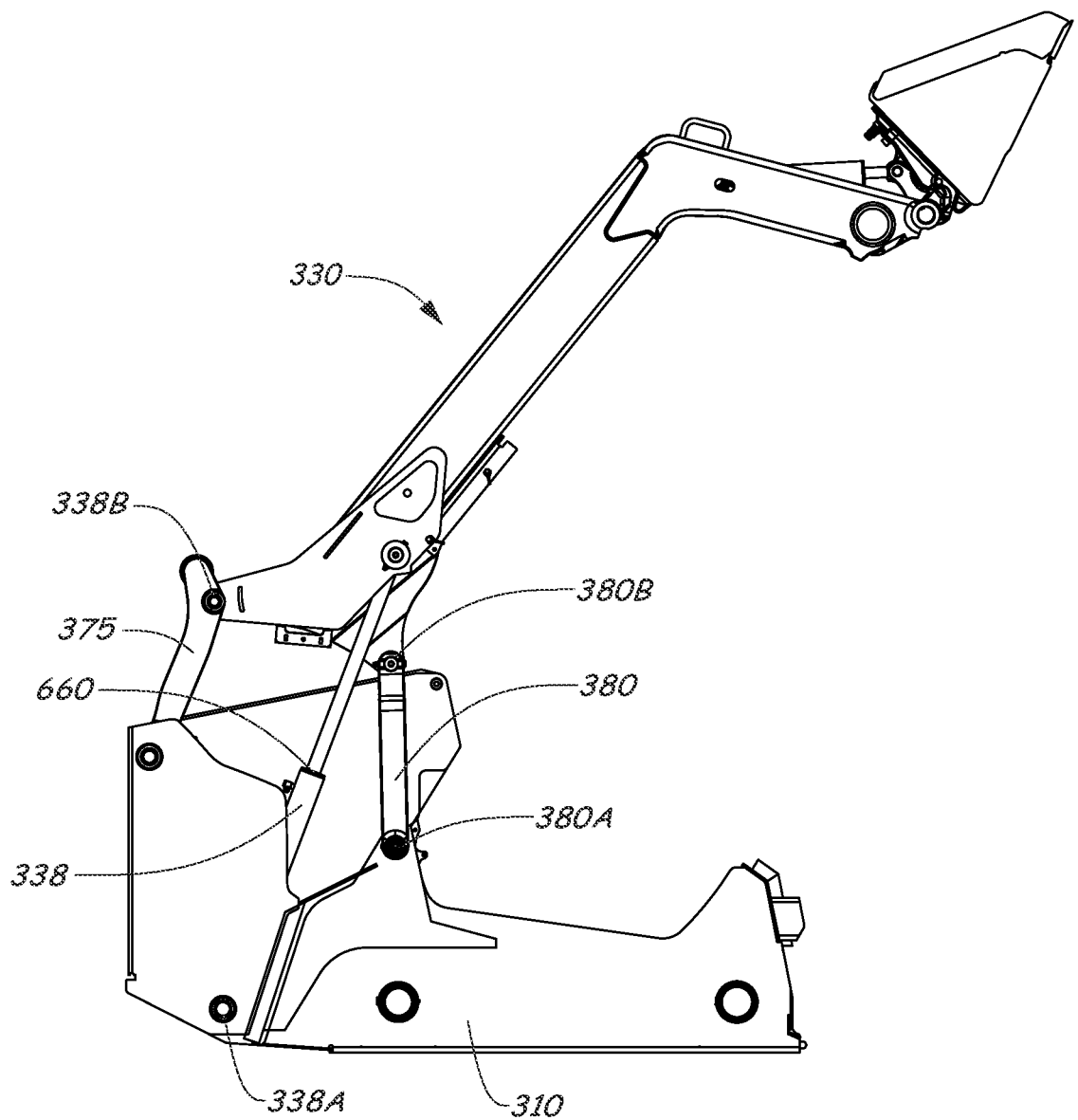

FIGS. 19-21 illustrate portions of the power machine 300 with the lift arm structure in various states of being raised, by lift cylinder 338, relative to the fully lowered state shown in FIG. 4. Of particular importance, power machine 300 is configured such that the paths of the driver link 380 and lift cylinder 338 can allow these components to be placed in close proximity to each other and to the frame 310, without the driver link 380 contacting the lift cylinder 338. The driver link 380 and follower link 375 are configured such that when the driver link pivot attachment 380B to the lift arm structure 330 crosses the lift cylinder 338, the pivot attachment 380B is above the uppermost or top position 660 of the base of the lift cylinder. Pivot attachment 380A is positioned behind a rear axle 386 of the loader as is shown in FIG. 19.

The driver link is configured such that the main lift arm portion pivot attachment 380B follows a movement arc that moves above the top 660 of the lift cylinder body as the main lift arm portion is raised and lowered by the lift cylinder. 338. In some embodiments, when the main lift arm portion is in a fully lowered position, the main lift arm portion pivot attachment 380B of the driver link is positioned rearward of the top 660 of the lift cylinder body, but when the main lift arm portion is in a fully raised position, pivot attachment 380B is positioned forward of the top of the lift cylinder body. In addition, the main lift arm portion pivot attachment 380B is positioned behind and above the pivot attachment 380A throughout its travel path from a fully lowered position (as is shown in FIG. 19) to a fully raised position (as is shown in FIG. 21).

Figure 22:
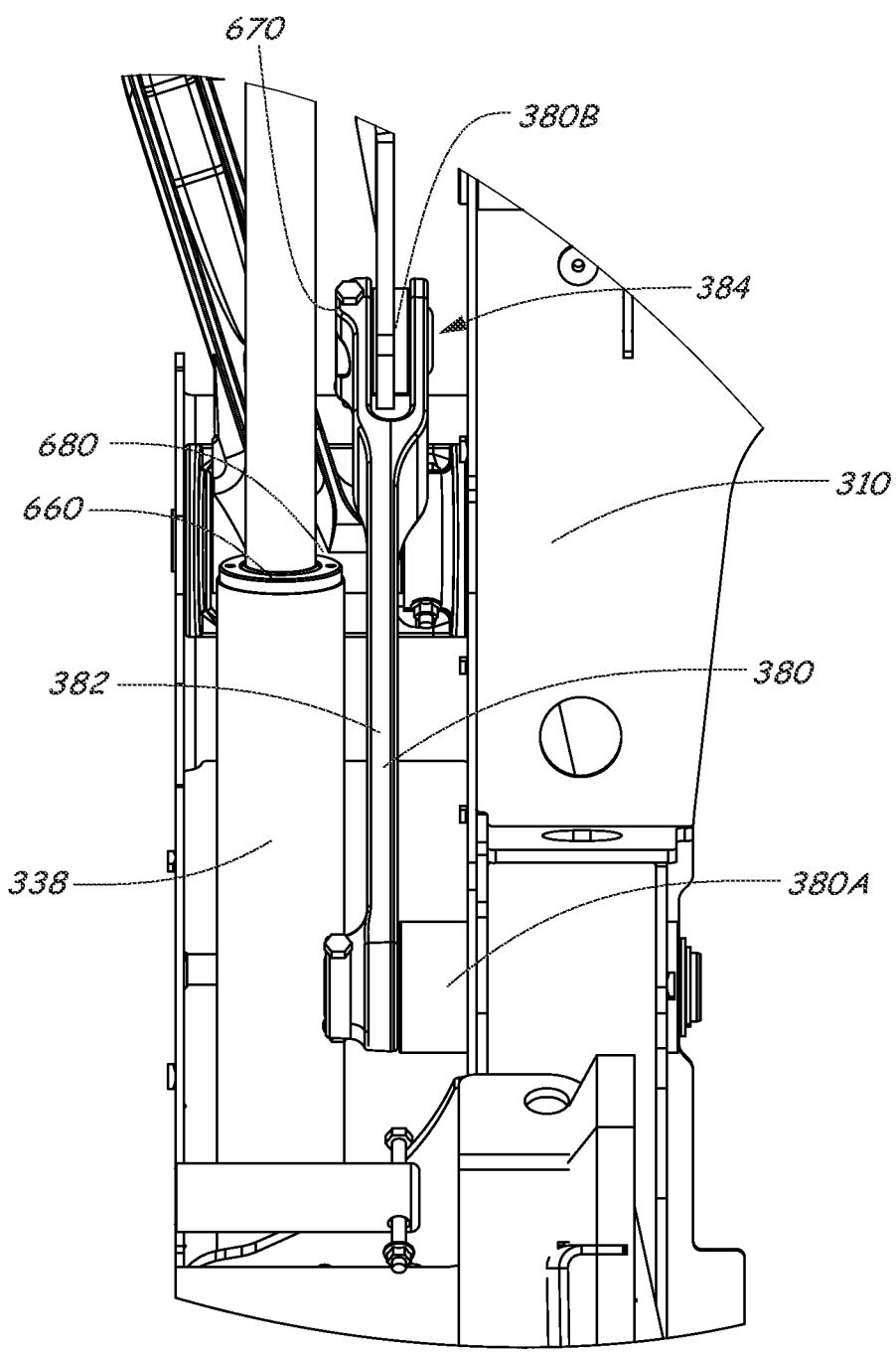
FIG. 22 is another illustration of the relationship between the driver link pivot and the base end of the lift cylinder in accordance with some embodiments.

As can be seen in FIG. 4, when the lift arm structure 330 is down and the lift cylinder 338 is fully retracted, the pivot attachment 380B is below the top 660 of the base of the lift cylinder. As the lift cylinder is extended (FIGS. 19-21) to raise the lift arm, the pivot 380B is higher than the top 660 of the lift cylinder base when the pivot passes (inward of) the lift cylinder. This configuration allows these components to be placed closer together and doesn't require widening of the power machine. FIG. 22 shows the pivot 380B having an outermost surface 670 at a positon laterally from the frame 310 of the power machine that would interfere with the inner most surface 680 of the base of the lift cylinder 338, but which is positioned to be above the top 660 of the base of the lift cylinder when the pivot 380B passes near the lift cylinder. In some embodiments, the maximum distance between the driver link 380 and the frame is greater than the minimum distance between the tilt cylinder and the frame, while at least a portion of the driver link is positioned between the tilt cylinder and the frame. Stated another way, a portion of the driver link 380 extends beyond the closest position of the lift cylinder 338 relative to the frame. As shown in FIG. 22, the driver link 380 has a clevis 384 on an end at which the driver link is coupled to the lift arm. The clevis end allows a main portion 382 the driver link to be narrow so as to be positioned closer to the frame of the machine.

Although the present disclosure has been described by referring to various embodiments, workers skilled in the art will recognize that changes may be made in form and detail without departing from the spirit and scope of the disclosure.

What is claimed is:

1. A power machine comprising:
   a frame having a rear axle extending therethrough;
   a lift arm structure including a main lift arm portion and a driver link, the driver link having a frame pivot attachment and a main lift arm portion pivot attachment such that the driver link is pivotally coupled to the frame and to the main lift arm portion, wherein the frame pivot attachment of the driver link is positioned rearward of a centerline of the rear axle;
   a lift cylinder pivotally coupled to the frame and to the main lift arm portion and configured to raise and lower the main lift arm portion, the lift cylinder having a lift cylinder body with a lift cylinder body top;
   wherein the driver link is configured such that the main lift arm portion pivot attachment of the driver link is positioned below and behind the lift cylinder body top when the main lift arm portion is in a fully lowered position, and such that as the main lift arm portion is raised by the lift cylinder and when the main lift arm portion pivot attachment of the driver link crosses from behind the lift cylinder body top to a position in front of the lift cylinder body top, the main lift arm portion pivot attachment of the driver link is above the lift cylinder body top.

2. A power machine comprising:

a frame having a rear axle extending therethrough;

a lift arm structure including a main lift arm portion and a driver link, the driver link having a frame pivot attachment and a main lift arm portion pivot attachment such that the driver link is pivotally coupled to the frame and to the main lift arm portion, wherein the frame pivot attachment of the driver link is positioned rearward of a centerline the rear axle;

a lift cylinder pivotally coupled to the frame and to the main lift arm portion and configured to raise and lower the main lift arm portion, the lift cylinder having a lift cylinder body with a lift cylinder body top;

wherein when the main lift arm portion is in a fully lowered position the main lift arm portion pivot attachment of the driver link is positioned rearward of the lift cylinder body top, and wherein when the main lift arm portion is in a fully raised position, the main lift arm portion pivot attachment of the driver link is positioned forward of the lift cylinder body top, and wherein a main portion of the driver link is positioned inward toward the frame relative to the lift cylinder body, and wherein a portion of the lift cylinder is positioned inboard of a portion of the driver link.

3. The power machine of claim 2, wherein the driver link is configured such that the main lift arm portion pivot attachment of the driver link is positioned below and rearward of the lift cylinder body top when the main lift arm portion is in a fully towered position, and such that as the main lift arm portion is raised by the lift cylinder when the main lift arm portion pivot attachment of the driver link crosses from rearward of the lift cylinder body top to a position in front of the lift cylinder body top, main lift arm portion pivot attachment, of the driver link is above the lift, cylinder body top.

* * * * *

UNITED STATES PATENT AND TRADEMARK OFFICE
CERTIFICATE OF CORRECTION

| | |
|---|---|
| PATENT NO. | : 11,732,436 B2 |
| APPLICATION NO. | : 17/185190 |
| DATED | : August 22, 2023 |
| INVENTOR(S) | : Branden Schiwal |

It is certified that error appears in the above-identified patent and that said Letters Patent is hereby corrected as shown below:

In the Claims

Column 16, Claim 3, Line 12, please replace the word "towered" with the word --lowered--.

Column 16, Claim 3, Line 16, please insert the word --the-- between the words "top," and "main".

Signed and Sealed this
Twenty-fourth Day of October, 2023

*Katherine Kelly Vidal*

Katherine Kelly Vidal
*Director of the United States Patent and Trademark Office*